United States Patent Office 3,754,045
Patented Aug. 21, 1973

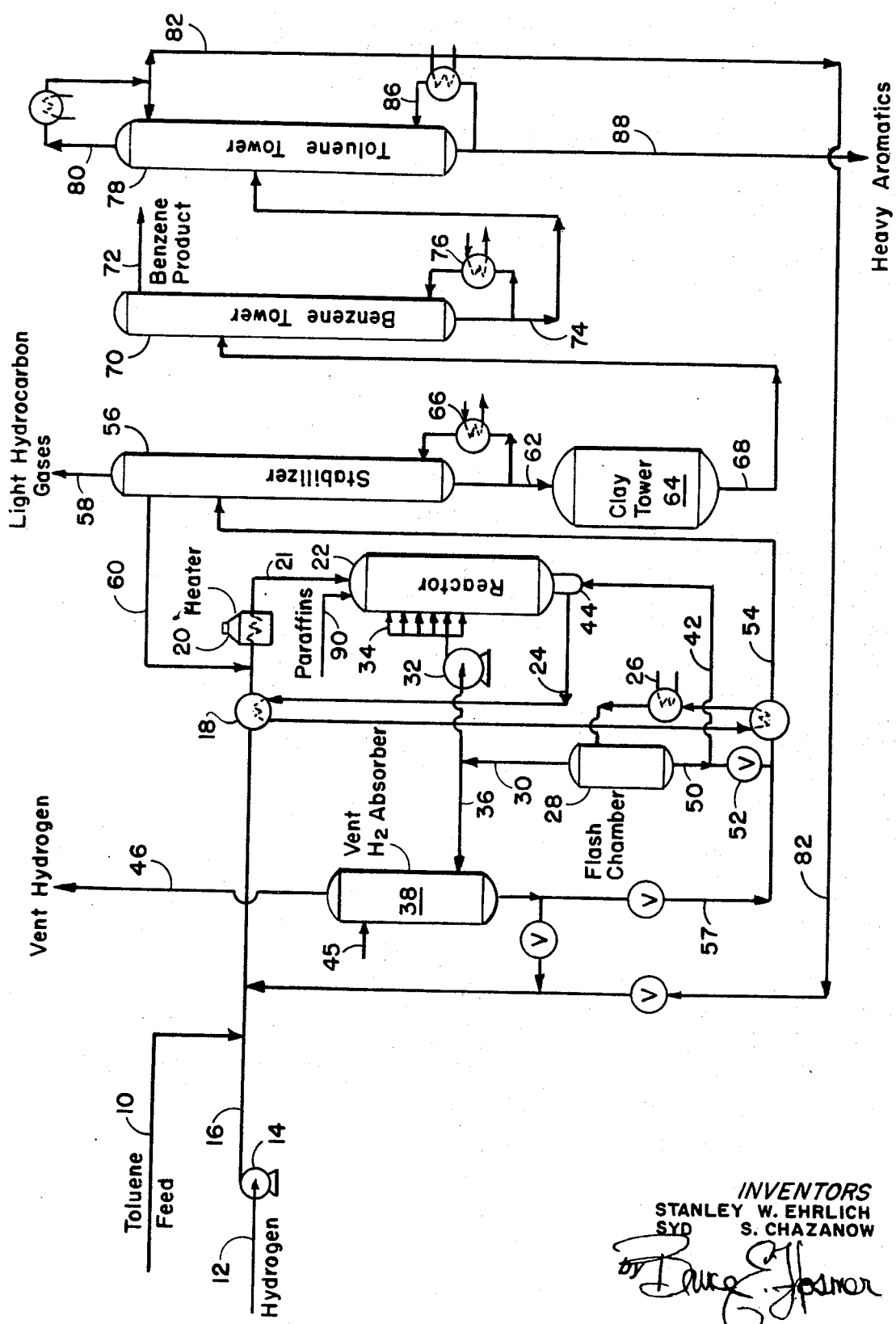

3,754,045
HYDRODEALKYLATION
Stanley W. Ehrlich, Far Rockaway, and Syd S. Chazanow, Floral Park, N.Y., assignors to Hydrocarbon Research, Inc., New York, N.Y.
Filed July 26, 1971, Ser. No. 165,964
Int. Cl. C07c 3/58
U.S. Cl. 260—672 NC  4 Claims

ABSTRACT OF THE DISCLOSURE

The reaction rates and temperatures for the thermal hydrodealkylation of a paraffin-free toluene feed with a paraffin-free hydrogen are controlled by the addition of light paraffin hydrocarbons boiling in the $C_3$ to $C_6$ range.

BACKGROUND OF THE INVENTION

The thermal hydrodealkylation of toluene is more fully described in U.S. Pat. No. 3,291,849, and many examples of the process are in worldwide commercial operation. For many purposes the utility of the non-catalytic, thermal hydrodealkylation process has proven to be superior for the production of benzene from toluene or other higher single ring alkylated aromatics. While primarily applicable to this reaction, it will be appreciated that the features of the thermal hydrodealkylation process are also applicable to conversion of alkylated naphthalenes in the production of napthalene.

The prior art processes were developed for and operated on toluene feeds that were relatively impure in that they contained appreciable quantities of paraffinic non-aromatic hydrocarbons such as heptanes and hexanes. At the same time, these processes also normally used hydrogen that frequently contained paraffinic non-aromatic hydrocarbons such as propanes and butanes. The hydrodealkylation processes that were designed based on these impure toluene and make up hydrogen feeds had a controllable reaction rate and temperature.

More recently, technical developments have made relatively pure, paraffin-free, toluene available for use in hydrodealkylation reactors. Additionally, hydrogen purification techniques have improved such that the make-up hydrogen is also available at higher purity.

If one now operates a hydrodealkylation unit using these pure feeds, in accordance with the prior art teachings, it is found that the hydrodealkylation reaction conditions are not adequate for initiating the reaction. The threshold temperature of the feed must be raised above that of the teachings of the prior art in order to initiate the reaction. In some cases it has been essential to establish a reactor threshold temperature of at least 1250° F. When the feed temperature is increased, control of the hydrodealkylation reaction rate and temperature becomes difficult.

The threshold temperature required in a hydrodealkylation reactor can be reduced through the addition of light paraffin hydrocarbons to the feed. At the same time, however, these paraffins cause an increase in the rate of reaction between the toluene feed and the hydrogen in the production of benzene.

Customarily, the paraffins have been directly added to the cold hydrodealkylation feed. Consequently these light paraffins passed through the whole heating train before entering the hydrodealkylation reactor. As a result of the change in the paraffin purity of the hydrodealkylation feed composition, paraffin addition to the cold feed has proved to be an undesirable operation, as it causes reactions to occur before the reactants have entered the reactor, thereby causing a loss in the control of the reaction rate and temperature.

Significant factors in the commercial design of a hydrodealkylation plant for the economic production of benzene are the reaction rates and reaction temperatures. In operating under the prior art teachings, with the present day paraffin-free feed compositions, the hydrodealkylation reaction requires significantly higher threshold temperatures as the hydrodealkylation of a high purity feed takes place at higher temperatures or, as a result of paraffin addition, faces a loss of control over the reaction rates as a result of reactions occuring before the reactor.

The fired furnace and transfer lines passing therefrom to the reactor are not designed to handle the occurrence of hydrodealkylation reactions before the reactants reach the reactor. The hydrodealkylation reaction is normally controlled by establishing the outlet temperature of the reactants leaving the furnace. When paraffins are added to a paraffin-free cold hydrodealkylation feed, the temperature of the reactants leaving the furnace increases as a result of reactions occuring before the reactants reach the reactor. This increase in temperature has an effect on the temperature sensing elements that regulate the fuel firing rate of the furnace, based upon the outlet temperature of the reactants leaving the furnace. As the outlet temperature increases, due to reactions, the sensing elements reduce the furnace temperature by closing off the fuel to the burners in the furnace. As the reactants reach the reactor a part of the hydrodealkylation of the feed has already occurred. Such an operation greatly complicates the efficient operation of the hydrodealkylation unit through loss of control over the reaction. The detrimental effects of the uncontrolled premature reactions upon the furnace and transfer lines result in shortened life expectancy of the hydrodealkylation unit.

SUMMARY OF THE INVENTION

In accordance with our invention it was discovered in the hydrodealkylation of paraffin-free alkyl aromatic compounds, that the furnace need not be heated over an usual temperature of 1200 to 1250° F. when the paraffns are added to the feed at a point immediately upon entering the reactor. The reaction is initiated in the reactor at the lower threshold temperatures as a result of the paraffin addition which has a pseudo-catalytic effect. The heat evolved through the cracking of the paraffins may locally raise the temperature level to start the reaction. Thus virtually no hydrodealkylation reaction takes place in the furnace and transfer line, nor are they excessively heated.

The paraffins, however, are preferably added to the top of the reactor, as for example, using the top quench line or through an injection line. Through this addition of paraffins at the reactor, the reaction rate, at the prevailing temperature, is significantly increased without requiring an increased reactor threshold temperature while at the same time the hydrodealkylation reaction proceeds in a controlled manner. The addition of paraffins increases the hydrodealkylation reaction rate constant. Thus, by addition of paraffins for the same reactor volume and temperature profile used without such addition, the conversion can go from 65 to over 90 percent or alternatively, a smaller reactor can give the same conversion.

As used herein the term "paraffin-free alkyl aromatic compound" means an alkyl aromatic feed material that contains not more than one and one half percent of saturated non-aromatics, paraffins, boiling in the $C_3$ to $C_6$ range, not more than one percent boiling in the range of $C_7$ and up and not more than one percent where the paraffins present comprise $C_7$ and up with $C_3$ to $C_6$ boiling range. The saturated non-aromatics, meaning those paraffins having at least three carbon atoms, present in the feed will be limited by the boiling range of the alkyl aromatics used as the feed unless the non-aromatics are separately added to the feed rather than present as those that are carried over in the fractionation cut that is used as the alkyl aromatic feed.

The amount of paraffins and the boiling range of paraffins to be added to the hydrodealkylation reactor depend upon the conversion temperature, pressure, reaction time and reactor volume which are used as the basis for the design parameters. Usually the parafins to be added are preferably boiling in the $C_3$ to $C_6$ range and the amount to be added will usually not exceed 6 volume percent based on the feed. Through such addition, the life of the furnace and transfer line is lengthened, the ability to control the reaction rate is stabilized, the threshold temperature is reduced, and the conversion of the alkyl aromatic feed is increased to a level that is in accordance with the increased purity of the feed. The paraffins may be added as a liquid or as a vapor, but the latter is preferable as a higher degree of mixing is obtained.

DESCRIPTION OF THE DRAWINGS

The drawing is a schematic view of a hydrodealkylation unit for the conversion of paraffin-free alkyl aromatic compounds.

DESCRIPTION OF THE PREFERRED EMBODIMENT

The hydrodealkylation unit hereinafter described is primarily designed to produce high purity aromatic compounds from a paraffin-free alkyl aromatic feed and preferably to produce high purity benzene from a nitration grade toluene feed and a paraffin-free hydrogen. The following description will be based on the preferred toluene feed.

A hydrogen supply at 12 comprising less than one percent of paraffin impurities boiling in the range of $C_3$ and above is compressed at 14 and combined with toluene feed comprising less than one percent of paraffins boiling in the range of $C_3$ and above from 10 in line 16. The combined reactants are usually partially heated as in a heat exchanger 18 following which they pass through a fired heater 20 and transfer line 21 before entering the reactor 22.

The reactor 22 is an internally insulated chamber containing no catalyst and having no effective catalytic surfaces. The reactor is operated at temperatures between 1100 and 1500° F. and at pressures between 500 and 800 p.s.i.g. but preferably 1350° F. and 600 p.s.i.g. It is so sized that the residence time of the total feed is in the range of about 10 to 50 seconds but preferably 20 to 40 seconds. The temperature profile in the reactor is so controlled that it does not exceed 1350° F. at any point within the reactor. It is also controlled so that about 75 percent of the alkylated aromatic hydrocarbons in the total feed are converted. At the outlet 44 the reactor effluent is quenched to about 1200° F. by liquid quench 42.

As more particularly described in U.S. Pat. 3,291,849, the reactor effluent 24 is cooled by heat exchange against reactor feed 16 in the heat exchanger 18, by heat exchange in absorber bottoms 57 and flash chamber liquid 50 in heat exchanger 51, and further by cooling in exchanger 26 as with water before entering the flash chamber 28. Part of the flashed vapor 30 under suitable compression at 32 is used to quench the reactor 22 through the various quench lines 34. The net vapor at 36 passes to a vent hydrogen absorber 38 counter-current to a suitable scrubbing liquid at 45, and the vent hydrogen leaves at 46.

Part of the liquid from flash chamber 28 is removed at 50 and is passed in part through the line 42, to assist in the quench of the reactor at the outlet 44. The net liquid is reduced in pressure at 52 and passes through line 54 to the stabilizer tower 56. Liquid in line 57 from the vent hydrogen absorber may be combined with the liquid 50 in passing to the stabilizer 56.

Light hydrocarbon gases and any water which are present in the stabilizer feed 54 are removed overhead at 58, with a sidestream 60 returned to the feed line 16 prior to the heater 20.

The bottoms from the stabilizer 56 are removed in line 62 and pass to the clay tower 64, it being understood that a reboiler circuit 66 may be used to maintain the desired bottoms temperature.

The clay tower effluent 68 passes to the benzene tower 70 with high purity benzene removed overhead at 72 and a higher aromatics containing bottoms removed at 74. This tower will also have a reboiler circuit 76 to maintain the desired separation in the tower.

The aromatics stream 74 is then passed to the toluene tower 78 from which an alkylated aromatic mixture of toluene is removed overhead at 80. By suitable condensation and separation a part of the toluene will be returned to the tower and the net toluene tower overhead removed at 82 may be recycled to the feed line 16. A reboiler circuit 86 may be used to maintain the bottoms temperature in this tower. The heavy aromatics are removed at 88.

As heretofore mentioned the criticality of our invention depends on the addition of a small controlled quantity of paraffins in the line 90 preferably to the upper part of the reactor 22. It could be aded to the transfer line 21 at a point close to the reactor 22. By injecting the liquid paraffins into the hot hydrogen-rich transfer line 21, vaporization is assured, better distribution is provided in the reactor, and hot spots are avoided.

As the paraffin hydrocarbons are not added to the feed, the effluent from the furnace 20 need not be heated over about 1250° F., and thus comparatively little reaction will take place in the furnace 20 and transfer line 21. The paraffins may also be added to the top of the reactor utilizing the top quench lines 34 or adding additional injection lines. In this way the reaction will take place in the reactor, and with the aid of the customary thermocouples that control the quench lines, the desired temperature profile can be maintained throughout the reaction.

The amount of paraffins to be added usually varies, up to 6 volume percent of the toluene feed. This amount is kept to a minimum as it adds unnecessarily to the hydrogen consumption, quench requirements and reactor volume.

It will be recognized that the quench lines 34, shown in the drawing, although shown diagrammatically, represent the introduction of controlled amounts of quench at various levels throughout the reactor under control of suitable thermocouples.

While we have shown and described a preferred form of embodiment of our invention, we are aware that modifications may be made thereto within the scope and spirit of our description herein and only such limitation should be made thereto as come within the terms of the claims appended hereinafter.

We claim:
1. A process for the thermal hydrodealkylation of a feed stream comprising alkyl aromatic compounds and less than one and one half percent of saturated-non-aromatic paraffins boiling in the $C_3$ to $C_6$ range, and less than one percent boiling in the range of $C_7$ and up wherein the improvement comprises:
   (a) passing said feed with a paraffin-free hydrogen through a pre-heater wherein said feed and hydrogen are heated to a temperature between 1200 and 1250° F. to avoid premature hydrodealkylation reactions;

(b) feeding said heated feed and hydrogen in an unreacted state to a thermal hydrodealkylation reactor;
(c) adding less than six volume percent, based on said feed, of $C_3$ to $C_6$ boiling paraffins to the feed at said reactor;
(d) maintaining the temperature in said reactor at a temperature between about 1100 and 1500° F. and a pressure between about 500 and 800 p.s.i.g., and
(e) recovering a product effluent containing benzene.

2. The process of claim 1 wherein said alkyl aromatic compound is a nitration grade toluene, the temperature of the feed prior to entering the reactor is about 1200° F. and the conversion rate is in excess of 75 volume percent.

3. The process of claim 1 wherein the hydrodealkylation reaction temperature is maintained at below 1350° F.

4. The process of claim 1 wherein at least 75 percent of said feed stream is converted to benzene.

References Cited

UNITED STATES PATENTS

| | | | |
|---|---|---|---|
| 3,296,323 | 1/1967 | Myers et al. | 260—672 NC |
| 2,929,775 | 3/1960 | Aristoff et al. | 260—672 NC |
| 3,150,196 | 9/1964 | Mason | 260—672 NC |
| 3,330,760 | 7/1967 | Hirschbeck et al. | 260—672 NC |

CURTIS R. DAVIS, Primary Examiner